US006984919B2

(12) United States Patent
Iino et al.

(10) Patent No.: US 6,984,919 B2

(45) Date of Patent: Jan. 10, 2006

(54) CONTROL SYSTEM FOR ULTRASONIC MOTOR

(75) Inventors: Akihiro Iino, Chiba (JP); Koji Nitadori, Chiba (JP); Masao Kasuga, Chiba (JP)

(73) Assignee: Seiko Instruments Inc., Chiba (JP)

( * ) Notice: Subject to any disclaimer, the term of this patent is extended or adjusted under 35 U.S.C. 154(b) by 38 days.

(21) Appl. No.: 10/395,674

(22) Filed: Mar. 24, 2003

(65) Prior Publication Data

US 2004/0007943 A1 Jan. 15, 2004

(30) Foreign Application Priority Data

Mar. 26, 2002 (JP) ............................ 2002-086228

(51) Int. Cl.
*H02N 2/06* (2006.01)

(52) U.S. Cl. ................................ 310/316.01; 310/317

(58) Field of Classification Search .......... 310/316.01, 310/317

See application file for complete search history.

(56) References Cited

U.S. PATENT DOCUMENTS 4,914,336 A * 4/1990 Yamasaki .............. 310/316.02
5,907,212 A * 5/1999 Okada ........................ 310/328
6,005,328 A * 12/1999 Suganuma ............. 310/316.01
6,064,140 A * 5/2000 Zumeris ................ 310/323.02
6,084,334 A * 7/2000 Yamamoto et al. .... 310/316.01
6,147,434 A * 11/2000 Nakano et al. ............. 310/317
6,285,115 B1 * 9/2001 Gallmeyer et al. ......... 310/317
6,570,294 B1 * 5/2003 Iino et al. .............. 310/316.01
2002/0008439 A1 * 1/2002 Senda et al. ........... 310/316.02
2003/0020368 A1 * 1/2003 Iino et al. .................. 310/317

FOREIGN PATENT DOCUMENTS

JP 07-083702 * 3/1995
JP 07-264879 * 10/1995
JP 11-042228 * 2/1999
JP 2003-021780 * 1/2003

* cited by examiner

*Primary Examiner*—Thomas M. Dougherty
(74) *Attorney, Agent, or Firm*—Adams & Wilks

(57) ABSTRACT

To provide a control system provided with a positioning mechanism including plural ultrasonic motors in the device, which can keep good operational stability as compared with a conventional system with a servo mechanism, is of an energy saving type suppressing power consumption and is compact in structure including the motor and a control circuit therefor. A control circuit in a control system of the present invention uses a common drive control circuit for a plurality of ultrasonic motors among the positioning mechanisms in which when the drive control circuit inputs a signal that specifies any ultrasonic motor and a desired-position designation signal, the drive control circuit conducts control operation that transmits an on signal to a driver of the subject motor to start the driving, and stops the driving when the motor reaches a desired position while receiving a position detection signal. Thus, the control system has a function of transmitting a signal indicating that the positioning operation is being conducted from a time point when commands are received to a time point when the positioning operation is completed. Then, an error signal is outputted when the motor is out of the desired position.

9 Claims, 4 Drawing Sheets

CONTROL SYSTEM FOR ULTRASONIC MOTOR

BACKGROUND OF THE INVENTION

1. Field of the Invention

The present invention relates to a circuit for controlling a plurality of ultrasonic motors, and more particularly, to a control system for a plurality of downsized ultrasonic motors which is suitably mounted on an electronic appliance.

2. Description of the Related Art

A servo motor is generally used for a positioning control mechanism such as an electronic appliance, and a motor is so driven as to move a member to be positioned to a desired position. In this case, a servo system is structured such that a present position of the member to be positioned is detected, a difference between the present position and the desired position is found and fed back to a drive portion of the motor to thereby control the driving of the motor so that a deviation signal becomes 0.

Because the motor used in the positioning control mechanism is generally of an electromagnetic type, the motor is susceptible to a disturbance vibration in a state where the member to be positioned reaches the desired position and a drive current does not flow, and there frequently occurs a phenomenon that the member to be positioned is deviated from the desired position. Therefore, even in the case where the desired position is not changed and the member to be positioned is originally in a stop state, when a positional displacement occurs due to the disturbance, the servo system is so actuated to be driven as to return the member to be positioned to the desired position. That is, because a conventional positioning mechanism has a property which is susceptible to the disturbance, there arises such a defect that an excessive electric power that corrects the influence is consumed.

As a motor having no defect that the positioning displacement is liable to occur due to the disturbance, attention has been paid to a vibration motor which is represented by an ultrasonic motor. This is because the vibration motor vibrates a vibrator having an elasticity due to a piezoelectric element or the like and imparts a drive force to a member to be driven as a rotor (or a slider) which is brought in pressure contact with the vibrator, and therefore even if the vibration stops, the member to be driven is structurally in pressure contact with the vibrator, which is equal to a kind of brake actuating state, and has a characteristic (self-holding function) that the member to be driven is difficult to be influenced by the disturbance vibration. Then, an attempt that as the servo motor of the positioning control mechanism, the conventional electromagnetic motor is replaced by the ultrasonic motor has been disclosed in JP 2001-268955 A, “Vibration motor, positioning device and method of controlling the vibration motor”, or the like.

Recently, a demand that the positioning mechanism is intended to be incorporated into various electronic appliances increases, and it is an important subject that the device is not large-sized. From this viewpoint, the application of the ultrasonic motor that can obtain a required drive force by a downsized motor is first advantageous in the downsizing of the device as compared with the electromagnetic motor. However, in the case where the ultrasonic motor is applied, because, particularly in a device having a plurality of members to be driven, it is necessary not only to provide a plurality of ultrasonic motors for driving them but also to provide the same number of control circuit s for controlling the driving of the respective servo systems as that of the motors, there arises a problem in that the device is not prevented from being large-sized.

Also, because the member to be positioned may be deviated from the desired position due to the disturbance or the like even if the ultrasonic motor having a self-holding function is used, a conventional servo control is consequently required in order to obtain a system with high reliability. Then, because a plurality of motors conduct different driving, respectively, the control circuit becomes complicated, and a control IC (particularly gate/array) is large-sized.

SUMMARY OF THE INVENTION

The present invention has been made under the above-mentioned circumstances, and therefore an object of the present invention is to provide a control system for an ultrasonic motor including a positioning mechanism with a plurality of ultrasonic motors within the device, which keeps the operation stability as compared with the conventional system having the servo mechanism, and is of an energy saving type that suppresses a power consumption, compact in the structure including the motor and the control circuit for the motor and high in reliability.

In order to achieve the above object, according to the present invention, there is provided a control system that particularly uses a common drive control circuit for a plurality of ultrasonic motors among the positioning mechanisms in which when the drive control circuit inputs a signal that specifies any ultrasonic motor and a desired-position designation signal, the drive control circuit conducts control operation that transmits an on signal to a driver of the subject motor to start the driving, and stops the driving when the motor reaches a desired position while receiving a position detection signal. Thus, the control system has a function of transmitting a signal indicating that the positioning operation is being conducted from a time point when various commands are received to a time point when the positioning operation is completed.

Also, the control system includes a function of conducting a positioning correction operation when a difference between a position of the motor after the motor stops and the desired position exceeds a threshold value, and generates an error signal in the case where the difference exceeds the threshold value even if a given period of time elapses from an operation start time point, or in the case where the difference exceeds the threshold value even if a given number of times of correcting operations are repeated.

Also, the control system always receives the position detection signal even after the positioning operation has been completed, and outputs the error signal when the difference from the desired position exceeds the threshold value due to the disturbance or the like. In addition, the control system has a function of again executing the positioning operation upon receiving a command from a judgment/command means other than the control circuit when the error signal is generated, and also has a function of judging that the system is abnormal by the judgment/command means other than the control circuit when the error signals are outputted a given number of times to thereby stop the operation of the system or of generating an alarm.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Now, a description will be given in more detail of preferred embodiments of the present invention with reference to the accompanying drawings.

The present invention applies an ultrasonic motor from the viewpoint that the ultrasonic motor has a high torque although being downsized and has a holding torque during non-electrification as a motor which is applied to an appliance that requires a positioning mechanism for a plurality of members to be driven. Also, although a control circuit that drives the respective motors in order to drive the plurality of motors is required, and when there is provided a system having a conventional servo mechanism that controls so as to always detect a deviation signal between the present position and the desired position, and feed back the deviation signal to a driver so that the deviation signal becomes 0, the device inevitably becomes complicated and large-sized. Under the above circumstances, the present invention does not employ the servo system as in the conventional device, and conducts the operation of executing simple control such as the drive start for the desired position and the stop operation at the time of arrival, always detecting the deviation between the present position including a position at a non-driving time and a designated position and transmitting the deviation to the control circuit, detecting and judging that the deviation exceeds a predetermined threshold value by a command/judgment means connected to the control circuit, and executing the position adjusting drive toward the desired position, thereby reducing a load on the control circuit as much as possible while ensuring an accurate positioning control.

Because of a reduction in the load, one control circuit is not provided for one ultrasonic motor, but one control circuit can be used commonly for the plurality of ultrasonic motors. With this realization, although the control circuits of the same number as that of the motors are conventionally required, only one control circuit can be commonly used in the present invention, which is extremely effective in downsizing the device. In the case where the plurality of ultrasonic motors are driven under the control by one control circuit, there are operations which cannot be executed at the same time, and transfer of a signal between the control circuit and the command means that actuates the control circuit is necessarily limited. The present invention applies a system of processing the operation that cannot be executed at the same time in time division, and devises the timing at which the signal is transmitted and received so as to prevent a real-time positioning drive from being adversely affected as a whole.

Figure 1:
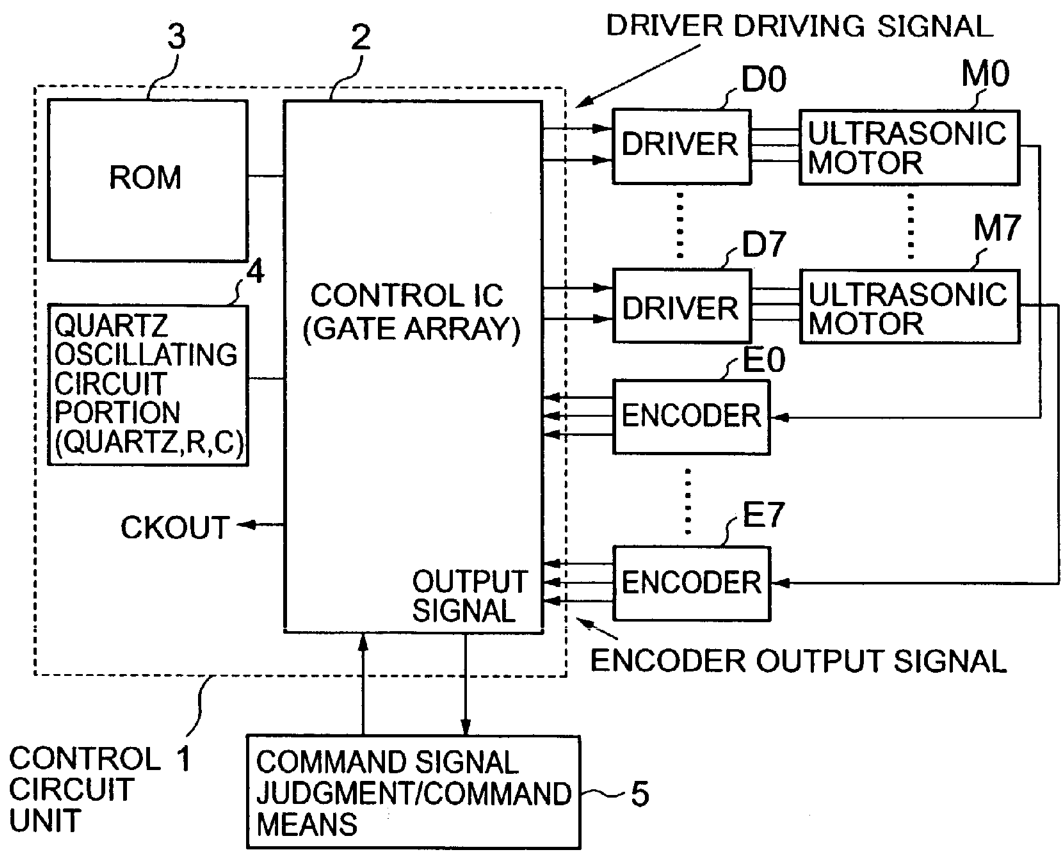
FIG. 1 is a block diagram showing a basic structure of a system in accordance with the present invention.

The operation of the present invention will be described below with reference to FIG. 1 showing the basic structure of a system of the present invention. A part surrounded by a broken line in the figure denotes a control circuit unit 1 which is a control circuit, and the control circuit unit 1 is composed of a control IC (gate/array) 2 having a function of distributing and outputting a drive signal to drivers of the respective ultrasonic motors, a ROM 3 that stores basic information of the present system therein, and a quartz oscillation circuit portion 4 for generating a timing clock necessary to drive the present control system. The control circuit unit 1 of a CPU, a command signal of the operation to be executed is outputted to the control circuit unit 1 from the judgment/command means 5, and a signal representative of an operation result or the like to be outputted from the control circuit unit 1 is transmitted to the judgment/command means 5.

The CPU may be commonly used so as to communicate with other functions of a device on which the control circuit of the present invention is mounted. The command signal includes signals that specify operation patterns, a signal that sets the desired position and a motor select signal. The signals that specify the operation patterns are of three types consisting of a CM-A that instructs the driving of the motor toward the origin, a CM-B that instructs the driving of the motor toward a given reference position, and a CM-T that instructs the driving of the motor toward the designated position. In this example, the number of plural ultrasonic motors is 8, but the present invention is not limited to this number.

The respective motors MO to M7 are equipped with drivers DO to D7 that drive the corresponding motors, and encoders EO to E7 indicative of the drive positions of the corresponding motors, respectively. When the control IC 2 receives a motor select signal MS that selects a k-th motor, the controller IC 2 turns on a motor in-operation signal for the designated motor, and outputs the motor drive signal MD from a signal gate to the a driver Kd of the corresponding ultrasonic motor Mk on the basis of the MS information to start the motor driving, and continues to output the motor drive signal until the encoder Ek indicates the desired position. That is, the corresponding drive Dk that has received the motor drive signal MD drives the motor Mk, and the present position of the driven motor is always detected by the encoder Ek, and fed back to the control IC2. When the position information is consistent with the desired position, the control IC2 turns off the motor drive signal to stop the motor driving.

In this situation, if normal operation where a difference between the stop position and the desired position are within the given threshold value, the motor in-operation signal turns off to complete the on operation of the motor. However, if the difference exceeds and is far from the given threshold value, the positioning correction operation is again executed such that the stop position approaches the desired position. If the difference between the stop position and the desired position is lower than the given threshold value, the motor in-operation signal turns off to complete the in-operation of the motor. However, in the case where the difference should not be lower than the given threshold value even if a given period of time elapses since the operation start time point, or in the case where the difference should not be lower than the given threshold value even if a given number of times of correction operations is repeated since the operation start time point, an error signal ES is outputted to the judgment/command means 5.

Also, in the present invention, the position detection is always conducted by the encoder, and even if the motor is out of the designated position due to some cause after the positioning operation of the motor has been completed, the error signal is transmitted. The error signal specifies the subject motor, and is then transmitted to the judgment/command means 5, and the motor select signal MS is again sent back to the control IC 2 from the judgment/command means 5. The motor Mk again selected by the motor selector signal MS is again driven to conduct the position correcting operation. The present invention further provides the following function. That is, when the difference between the present position and the desired position cannot become lower than the threshold value even if the judgment/command means 5 repeats the position correction according to the error signal a given number of times, it is judged that an abnormality occurs, and the operation of the system is stopped, or an alarm is issued.

The most significant feature of the system according to the present invention resides in that the control IC 2 receives the operation command signal, and continues to output the motor in-operation signal from a time point when the operation of the motor starts with the selection of any one of the motors to a time point of the operation completion when the correct positioning can be recognized. The control IC 2 is so structured as to ignore any commands other than a reset command with respect to the subject motor, and come to a state where the command can be inputted after the motor in-operation signal is outputted with respect to other motors, while the motor in-operation signal is being outputted. With this structure, the positioning control of the plural motors can be executed by a small-scaled interface in quasi-real time with high efficiency and accuracy. The present invention is directed to a system in which the control circuit is simplified on the assumption that no error is generated even after completion of the positioning in the normal positioning operation.

Figure 2:
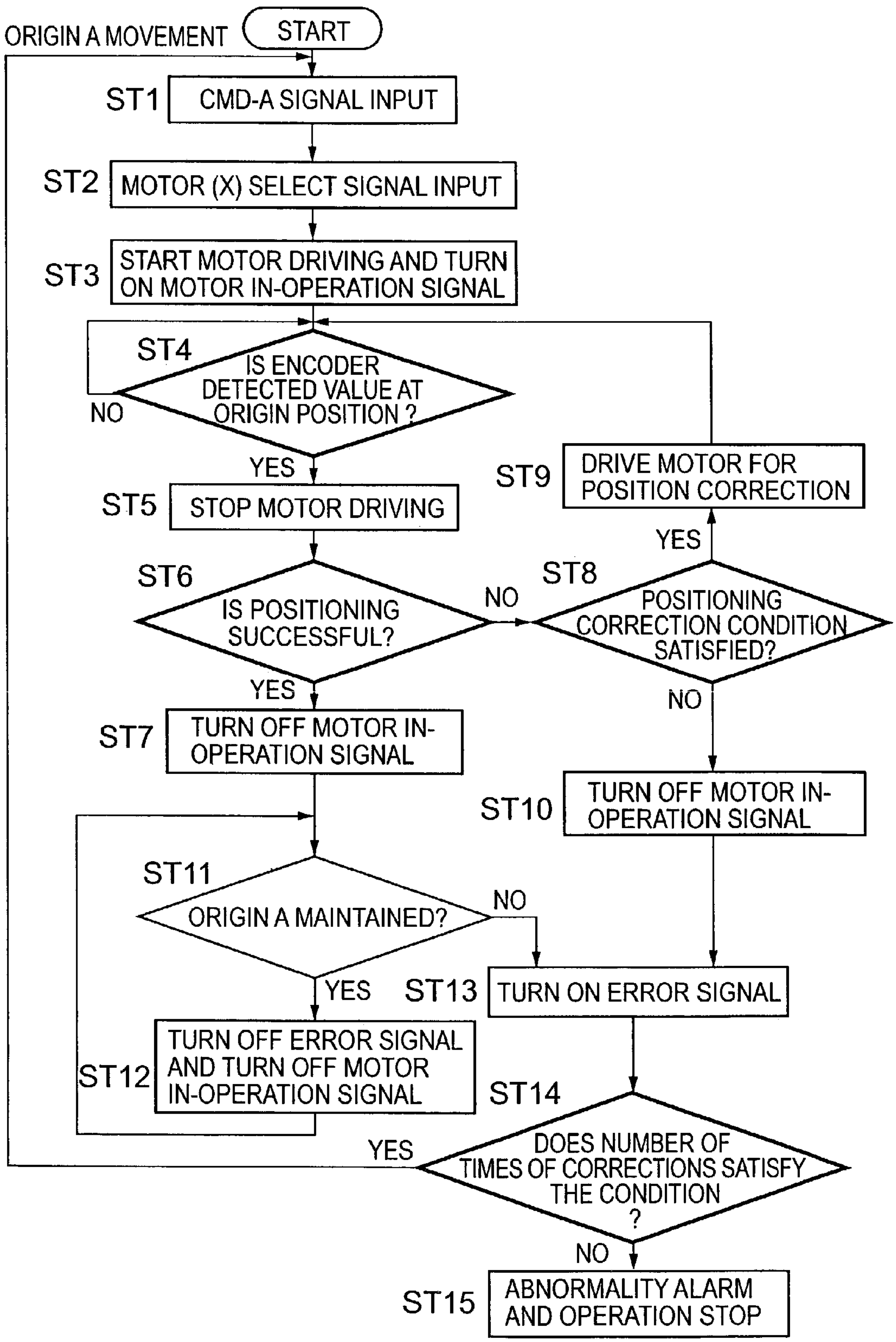
FIG. 2 is a flowchart showing the operation of the system in an origin travel mode in accordance with the present invention.

Then, the operation of the system in the case where the signal that specifies the operation pattern is a CM-A that instructs the driving of the motor toward the origin (called "mode A") will be described with reference to a flowchart shown in FIG. 2. The CM-A indicating that the operation pattern represents the movement of the motor toward the origin and the motor select signal are inputted from the judgment/command means 5 (Step 1). In this case, since the desired position is the origin, the desired position setting signal is not required, and the origin position information 0 of the encoder is employed. When a specific motor Mk is selected in response to the motor select signal MS in a state where the CM-A is inputted (Step 2), the motor drive signal is transmitted to the driver Dk of the subject motor, the motor starts to be driven, and the motor in-operation signal is turned on (Step 3).

The encoder Ek always detects the position change accompanied by the motor driving and transmits the detected position change to the control IC 2. The position information (encoder detected values) which changes every moment is compared with the origin position information 0 (Step 4), and the motor stops to be driven at the time where the former is coincident with the latter (Step 5). It is confirmed whether or not the motor could be positioned in an area of the origin at the time where the motor stops (Step 6). The confirmation is made by judging whether or not a deviation between the encoder detected value of the subject motor which is indicative of the stop position and the origin position is lower than the threshold value. If the deviation is lower than the threshold value, it comes to the conclusion that the positioning operation of the motor toward the origin has been successful, and the motor in-operation signal is turned off (Step 7), thereby completing the origin positioning operation. In the case where a positional displacement occurs to such a degree that the deviation exceeds the threshold value, it comes to the conclusion that the positioning has been unsuccessful, and the position correction is executed (Step 9).

The position information (encoder detected value) is compared with the origin position information 0 as in the above-mentioned positioning operation, and the motor stops to be driven at the time when the former is coincident with the latter. The above-mentioned correcting operation is executed by loop operation (Step 6, step 8, Step 9, Step 4, and Step 6) as shown in FIG. 2. When the positioning is not successful by the above correcting operation, the correcting operation is terminated, and an error signal is outputted. This is executed under the condition that the positioning cannot be completed within a given period of time (a start NG is also detected at this time), or that the positioning is not successful even if correcting operation is executed a given number of times. At a time point when the correcting operation is terminated, the motor in-operation signal is turned off (Step 10), and the error signal is turned on (Step 13).

Even in the case where the positioning is successful, a positional displacement may occur from the origin position due to some cause after that. It is judged in Step 11 whether or not the output of the encoder that always detects the motor position maintains the origin. If the positional displacement should occur, the error signal is turned on (Step 13). In the case where the error signal is outputted, the position correction is conducted so as to release the error signal. The control IC 2 transmits the positioning error signal related to the motor Mk to the judgment/command means 5, and a command and the motor select signal MS is sent back to the control IC 2 from the judgment/command means 5, to thereby again drive the motor Mk which is again selected in accordance with the motor select signal MS. Also, if the command is always in a transmission state, only the motor select signal MS may be again transmitted.

The subsequent operation is identical with the procedure described above. When the correction is not successful by the correcting operation, it is judged that the system is abnormal, and the correcting operation is terminated to output an alarm signal and/or an operation stop signal of the system (Step S15). This is executed under the condition that the position correction is not successful even if correcting operation is executed a given number of times. A threshold width that is used to judge the magnitude of a difference between the position of the motor after the motor stops and the desired position is set to be narrower when the motor in-operation signal is on to realize strict positioning during the positioning operation, thereby realizing such rational operation that the threshold width is widened in the positional displacement detection thereafter.

Then, the operation of the system in the case where a signal that specifies the operation pattern is a CM-B (called "mode B") that instructs the driving of the motor toward the reference position which is not the origin will be described. In this case, the operation is completely identical with the flowchart related to the CM-A shown in FIG. 2. Only a difference of the CM-B from the CM-A resides in that since the desired position is the reference position, not the origin position 0 of the encoder but the reference position information (for example the pulse-value of 16 bits) which is stored in the ROM is used, and this value is used in Step 4, Step 6 and Step 11. In the movement of the motor toward the origin A and the movement of the motor toward the reference point B, all of the ultrasonic motor 8 can be selected simultaneously because of no designation of the desired position and can be sequentially operated one by one with slight time lags.

Figure 3:
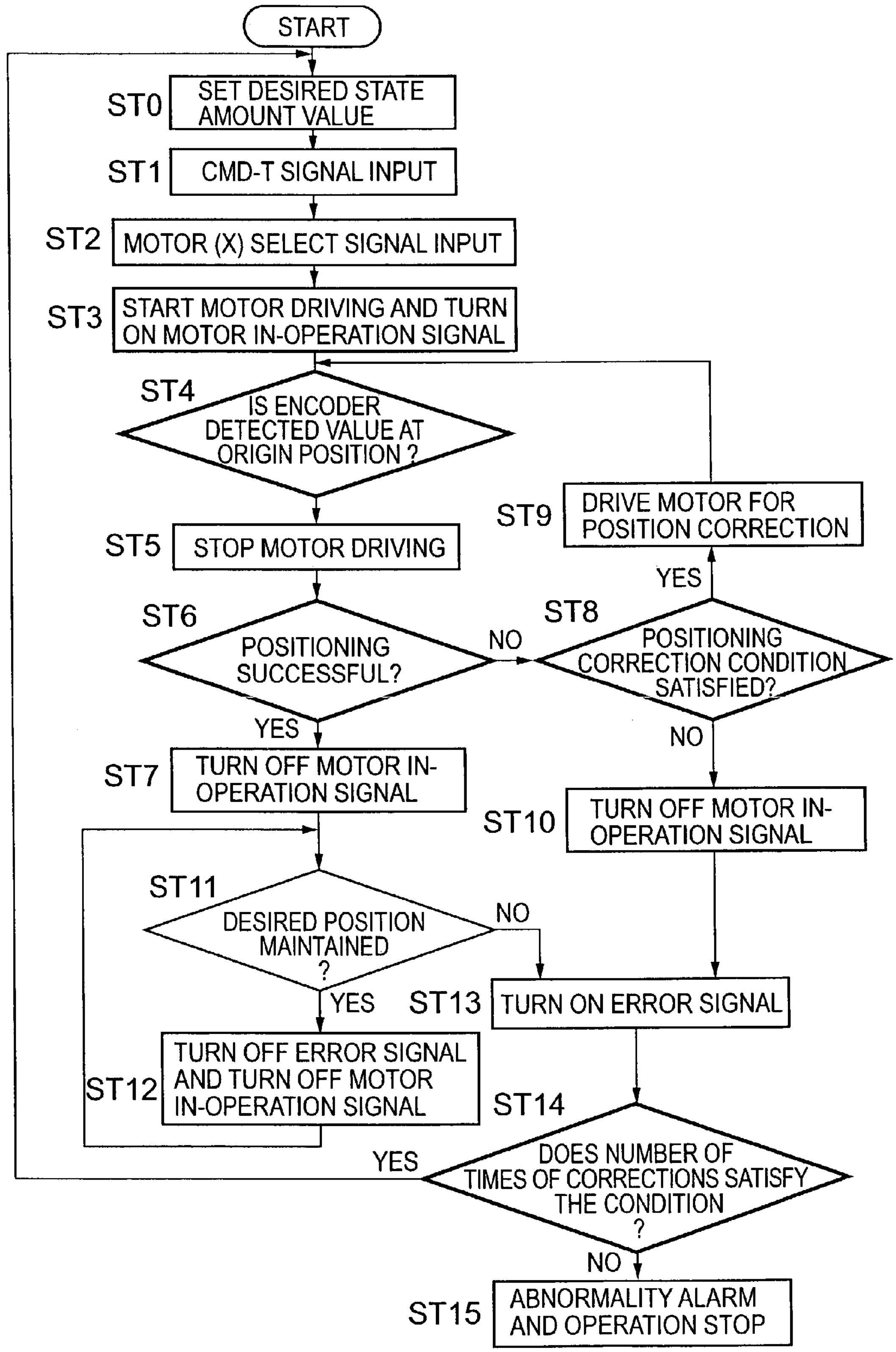
FIG. 3 is a flowchart showing the operation of the system in a desired state travel mode in accordance with the present invention.

Finally, the operation of the motor in the case where a signal that specifies the operation pattern is a desired state amount movement command CMT that instructs the driving of the motor toward an arbitrary designated desired position (called "mode Tin") will be described with reference to the flowchart shown in FIG. 3. In this case, a desired state amount value is first set in the judgment/command means 5 (Step 0), and the CMOS-T that indicates that the operation pattern is the movement of the motor toward the designated arbitrary desired position, a rotation direction instruction signal and the motor select signal as well as the desired position set signal is inputted from the judgment/command means 5. The desired position setting signals are of two types, and in a pattern 1, the desired position information is directly inputted in the form of a pulse signal, and in a pattern 2, the information which is stored in the ROM in advance is specified to find out the desired position information.

The flowchart in this case is basically identical with that of from Step 1 to Step 17 in the case of the origin movement. A difference of the former from the latter resides in that the desired position is the designated arbitrary position, and a comparative value used in Step 4, Step 6 and Step 11 is the desired position information which is directly inputted in the pattern 1, and is specific position information which is stored in the ROM in the pattern 2. In the case of the mode T, after the motor in-operation signal becomes in an output state except the case where the desired position setting signal is all of the motors, the respective ultrasonic motors are sequentially selected at given intervals. The distinction of the patterns 1 and 2 is conducted by setting within the ROM.

Figure 4:
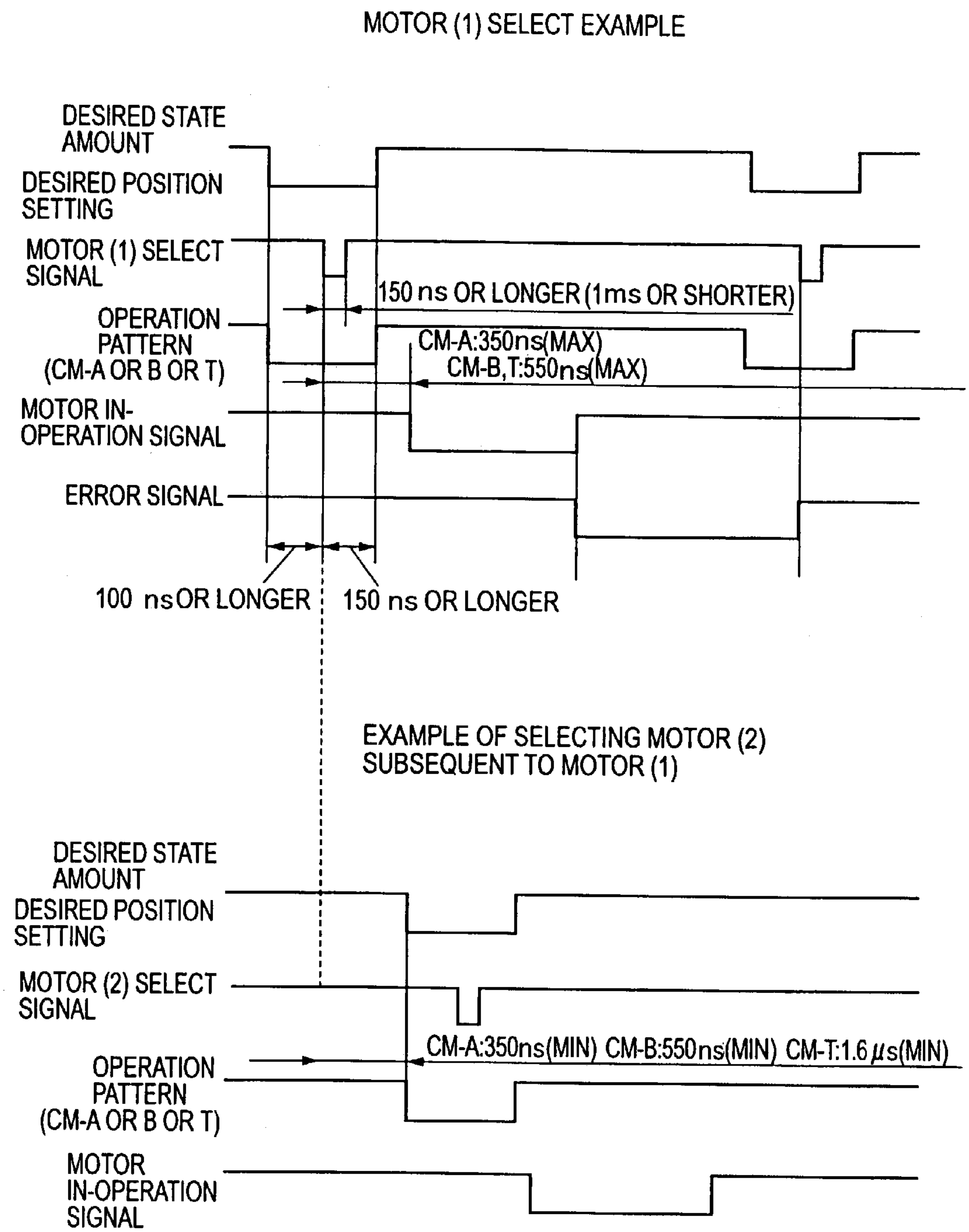
FIG. 4 is a timing chart for explaining timings at which various commands are received in accordance with the present invention.

Subsequently, timings at which various commands are received in accordance with the present invention will be described with reference to FIG. 4. In FIG. 4, the axis of abscissa represents a time axis, and the axis of ordinate represents a receivable state at a low level displayed portion. An upper portion exemplifies a case in which a motor (1) is selected, and a lower portion exemplifies a case in which a motor (2) is selected subsequently to the motor (1). The commands transmitted from the judgment/command means 5 are (1) the operation pattern commands of COM-A, B and T, (2) the desired position setting signal, and (3) the motor select signal that selects and specifies a motor to be driven, as described above. As shown in the figure, the operation pattern commands of (1) and the desired position setting signal of (2) are receivable from the beginning, but the motor select signal of (4) is receivable with a delay of 100 ns or longer from the beginning because 100 ns or longer needs to be spared since the command input.

In the case of the mode T, the motor select signal is inputted after 100 ns or longer and is spared from the later inputted signal among the desired state amount setting and the COM-T commands. The receivable period of the motor select signal is set to be equal to or longer than 150 nm and equal to or shorter than 1 ms. When the motor select signal is inputted, and the motor starts to be driven, the motor in-operation signal is turned on, and the command is receivable to another motor in this state as described above. This timing is 350 ns at the longest in the case of the mode A, and 550 ns at the longest in the case of the mode B and the mode T. As described above, when the positioning fails and the position correction also fails, the motor in-operation signal is turned off, but at that time, the error signal is outputted, and because the correcting operation is conducted in this state, the motor (1) select signal, the commands and the desired position setting signal can be inputted again.

In the case where the motor (2) is selected subsequently to the motor (1) as shown in the lower portion of FIG. 4, the command is receivable from the time point when the motor in-operation signal of the motor (1) is turned on, but the command for the motor (2) needs to be delayed 350 ns at the shortest in the case of the mode A, 550 ns at the shortest in the case of the mode B, and 1.6 $\mu$s at the shortest in the case of the mode T since the select signal of the motor (1) starts to be received. The operation pattern command of (1) and the desired position setting signal of (2) are receivable from the beginning at which that period of time is ensured, and the motor select signal of (4) is receivable with a delay of 100 ns or longer thereafter. Basically, the operation timing of the motor (2) is identical with that of the motor (1) except for the delay as long as the above-mentioned required and ensured period of time since the initial command for the motor (1) is received.

According to the present invention, a control circuit in the control system for an ultrasonic motor conducts control operation such that when a select signal that specifies any motor and a desired-position designation signal are inputted, an on signal is transmitted to the driver of a subject motor to start the driving of the motor, and the driving of the motor stops when the position of the motor reaches the desired position while the position detection signal is received. Since the control circuit has at least a function of transmitting a signal that indicates that the positioning operation has been completed, there can be provided a system which is not only compact in structure as compared with a case in which the ultrasonic motor per se is formed of an electromagnetic motor but also can use one control circuit commonly for a plurality of motors, and is extremely compact when the system is incorporated into various electronic appliances.

Also, the control circuit in the control system for the ultrasonic motor according to the present invention can sequentially receive a plurality of motor select signals at extremely short intervals, thereby being capable of executing the control of the plural ultrasonic motors with high efficiency and precision although only one control circuit is provided.

Further, the control circuit in the control system for the ultrasonic motor according to the present invention has a function of conducting the positioning correction operation when a difference between the position of the motor after the motor stops and the desired position exceeds a threshold value. Therefore, the operation is as good as any conventional system with the servo mechanism, the ultrasonic motor per se has the characteristic that withstands the disturbance, and the energy saving type that suppresses the power consumption can be realized because the motor is driven only as required. In the case where the difference is not lower than the threshold value even if a given period of time elapses from the operation start time point, or in the case where the difference is not lower than the threshold value even if correcting operation is repeated a given number of times, a structure that issues the error signal is applied so that countermeasure is readily conducted when the positioning is not successful.

Still further, according to the present invention, in the case where the motor position is detected even after the positioning has been completed and the motor position is deviated from the desired value, the error signal is outputted, and a threshold width that is used to judge the magnitude of a difference between the position of the motor after the motor stops and the desired position is set to be narrower when the motor in-operation signal is on to realize strict positioning during the positioning operation, thereby realizing such rational operation that the threshold width is widened in the positional displacement detection thereafter.

In the present invention, the judgment/command means other than the control circuit can always receive the error signal, and has a function of outputting a command that allows the positioning operation to be again executed when receiving the error signal. With this structure, although the structure is extremely simple as compared with the conventional servo motor system, the reliability and stability of the operation are kept.

In addition, since there are provided a function of judging that the system is abnormal and issuing an alarm when the error signals are outputted a given number of times, and a function of stopping the operation of the system, the durability of the appliance can be kept without an overload being applied to the system.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the, invention in various embodiments and with various modifications as are suited to the particular use contemplated. It is intended that the scope of the invention be defined by the claims appended hereto, and their equivalents.

What is claimed is:

1. A control system for an ultrasonic motor comprising:

a driving circuit for generating an on signal to a driver of the ultrasonic motor to start the driving of the ultrasonic motor upon inputting a command signal and for conducting control operation that stops the driving of the ultrasonic motor when the ultrasonic motor reaches a desired position while receiving a position detection signal;

a unit for generating a signal representing that the positioning operation is completed; and a unit which receives various commands for generating a signal representing that the positioning operation is being conducted from a time point when the driving of the ultrasonic motor starts upon receiving a motor select signal to a time point when the positioning operation is completed.

2. A control system for selectively driving a plurality of ultrasonic motors comprising:

a driving circuit for generating an on signal to drivers of the plurality of ultrasonic motors to start the driving of the ultrasonic motors upon inputting a command signal and for conducting control operation that stops the driving of the ultrasonic motors when the ultrasonic motors reach a desired position while receiving a position detection signal; and a unit for generating a signal representing that the positioning operation is completed;

wherein the control system is connected to the drivers that drive the plurality of ultrasonic, motor and specifies an ultrasonic motor to be driven upon inputting a select signal.

3. A control system for an ultrasonic motor comprising:

a driving circuit for generating an on signal to a driver of the ultrasonic motor to start the driving of the ultrasonic motor upon inputting a command signal and for conducting control operation that stops the driving of the ultrasonic motor when the ultrasonic motor reaches a desired position while receiving a position detection signal;

a unit for generating a signal representing that the positioning operation is completed; and a unit for conducting a positioning correction operation when a difference between a position of the ultrasonic motor after the motor stops and the desired position exceeds a threshold value, wherein an error signal is generated in the case where the difference is not lower than the threshold value even when a given period of time elapses from an operation start time point.

4. A control system for an ultrasonic motor comprising:

a driving circuit for generating an on signal to a driver of the ultrasonic motor to start the driving of the ultrasonic motor upon inputting a command signal and for conducting control operation that stops the driving of the ultrasonic motor when the ultrasonic motor reaches a desired position while receiving a position detection signal;

a unit for generating a signal representing that the positioning operation is completed; and a unit for conducting a positioning correction operation when a difference between a position after the ultrasonic motor stops and the desired position exceeds a threshold value, wherein an error signal is generated in the case where the difference is not lower than the threshold value even when correcting operation is repeated a given number of times.

5. A control system for an ultrasonic motor comprising:

a driving circuit for generating an on signal to a driver of the ultrasonic motor to start the driving of the ultrasonic motor upon inputting a command signal and for conducting control operation that stops the driving of the ultrasonic motor when the ultrasonic motor reaches a desired position while receiving a position detection signal; and a unit for generating a signal representing that the positioning operation is completed;

wherein the position detection signal is received even after the positioning operation is completed, and an error signal is generated even when a difference between the position of the ultrasonic motor and the desired position exceeds a threshold value.

6. A control system for an ultrasonic motor as claimed in claim 3; wherein a threshold width on the basis of which the amplitude of a difference between the motor stop position during the positioning operation and the desired position is judged is different from a threshold width on the basis of which the amplitude of a difference between the motor stop position after the positioning operation has been completed and the desired position is judged.

7. A control system for an ultrasonic motor as claimed in claim 3; further comprising judgment/command means for always receiving the error signal and outputting a command that again executes the positioning operation when receiving the error signal.

8. A control system for an ultrasonic motor as claimed in claim 3; further comprising judgment/command means for judging that the system is abnormal and stopping the operation of the system when error signals are outputted a given number of times.

9. A control system for an ultrasonic motor as claimed in claim 3; further comprising judgment/command means for judging that the system is abnormal and generating an alarm when error signals are outputted a given number of times.

* * * * *